United States Patent
Terasawa et al.

(10) Patent No.: US 6,735,606 B2
(45) Date of Patent: May 11, 2004

(54) MULTI-SEQUENCE FAST SLEWING PSEUDORANDOM NOISE GENERATOR

(75) Inventors: Daisuke Terasawa, San Diego, CA (US); Avneesh Agrawal, San Jose, CA (US); Sivarama Venkatesan, Eatontown, NJ (US)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 09/858,263

(22) Filed: May 15, 2001

(65) Prior Publication Data

US 2002/0174152 A1 Nov. 21, 2002

(51) Int. Cl.[7] .................................................. G06F 1/02
(52) U.S. Cl. ........................................ 708/252; 708/256
(58) Field of Search ................................. 708/252, 256

(56) References Cited

U.S. PATENT DOCUMENTS

| | | | | |
|---|---|---|---|---|
| 5,228,054 A | * | 7/1993 | Rueth et al. | 708/252 |
| 6,154,101 A | | 11/2000 | Zou et al. | 331/78 |
| 6,272,168 B1 | * | 8/2001 | Lomp et al. | 375/222 |
| 6,282,181 B1 | * | 8/2001 | Stark et al. | 370/335 |
| 6,339,781 B1 | * | 1/2002 | Sasaki | 708/252 |
| 2002/0013797 A1 | * | 1/2002 | Jha et al. | 708/250 |

FOREIGN PATENT DOCUMENTS

| | | |
|---|---|---|
| WO | 9956403 | 11/1999 |
| WO | 0128108 | 4/2001 |

* cited by examiner

*Primary Examiner*—David H. Malzahn
(74) *Attorney, Agent, or Firm*—Philip R. Wadsworth; Charles D. Brown; Geroge C. Pappas

(57) ABSTRACT

Techniques for fast-slewing of multi-sequence based PN generators are disclosed. In one aspect, LFSR states and reference counter states are loaded into their corresponding components such that consistency among the states is maintained. In another aspect, various methods for determining LFSR states and counter values in response to a desired offset in a unique code are disclosed. Among these methods are matrix-multiplication of LFSR states and generation of advanced LFSR states through masking techniques. Other methods are also presented. These aspects have the benefit of decreasing slew time in an efficient manner, which translates to increased acquisition speed, faster finger lock on multi-path signals, increased data throughput, decreased power, and improved overall system capacity.

20 Claims, 8 Drawing Sheets

MULTI-SEQUENCE FAST SLEWING PSEUDORANDOM NOISE GENERATOR

BACKGROUND

1. Field

The present invention relates generally to communications, and more specifically to a novel and improved method and apparatus for generating a pseudorandom noise (PN) sequence composed of one or more PN sequences, with the ability to rapidly slew from one offset to another.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. These named standards are incorporated herein by reference. A system that implements the High Rate Packet Data specification of the cdma2000 standard is referred to herein as a high data rate (HDR) system. The HDR system is documented in TIA/EIA-IS-856, "CDMA2000 High Rate Packet Data Air Interface Specification", and incorporated herein by reference. Proposed wireless systems also provide a combination of HDR and low data rate services (such as voice and fax services) using a single air interface.

Pseudorandom noise (PN) sequences are commonly used in CDMA systems for spreading of transmitted data, including transmitted pilot signals. CDMA receivers commonly employ RAKE receivers. A rake receiver is typically made up of one or more searchers for locating direct and multipath pilots from neighboring base stations, and two or more multipath demodulators (fingers) for receiving and combining information signals from those base stations.

Inherent in the design of direct sequence CDMA systems is the requirement that a receiver must align its PN sequences to those of the base station. The time required to transmit a single value of the PN sequence is known as a chip, and the rate at which the chips vary is known as the chip rate. For example, in IS-95, each base station and subscriber unit uses the exact same PN sequences. A base station distinguishes itself from other base stations by inserting a unique time offset in the generation of its PN sequences. In IS-95 systems, all base stations are offset by an integer multiple of 64 chips. A subscriber unit communicates with a base station by assigning at least one finger to that base station. An assigned finger must insert the appropriate offset into its PN sequence in order to communicate with that base station. It is also possible to differentiate base stations by using unique PN sequences for each rather than offsets of the same PN sequence. In this case, fingers would adjust their PN generators to produce the appropriate PN sequence for the base station to which it is assigned. Adjusting the offset in the PN sequence is known as slewing.

An early CDMA PN generator commonly consisted of a linear feedback shift register (LFSR). When not slewing, the LFSR would be enabled once per chip to produce a new state and output a new chip in the PN sequence. To perform slewing, the LFSR would be either disabled to perform a retard, or enabled twice per chip to perform an advance. Thus, a simple PN generator might be capable of stewing in either direction at a rate of one chip per chip time. A slight improvement can be had if the clock rate of the LFSR is a higher rate, for example eight times the chip rate. Then, advances could be performed at a rate of eight chips per chip time (since the enable could be activated for all eight cycles occurring in a chip). Retards would still be limited to one per chip. Control logic can be added to such an LFSR based system such that slewing can be directed by simply providing an offset to the PN generator and a command to slew to that offset. While slewing in an early PN generator may have been performed by continuously moving the PN state, as just described, the term "slewing" is used generally throughout the following description to identify any process of producing a desired offset in a PN sequence.

Overall system performance is enhanced when each finger can rapidly align its PN sequence with the transmitted PN sequence. There are a variety of reasons for this. Upon initial acquisition, a fast slewing PN generator will reduce the time from finger assignment to demodulation. A searcher, so equipped, will be able to locate neighboring base stations sooner, and thus handoff will be more efficient and effective. Strong multipath signals that fade in and out rapidly are more likely to be demodulated and usefully combined when fingers can respond rapidly to changes in PN offset. Therefore, it is desirable to utilize PN sequences which can rapidly transition from one offset in a PN sequence to another.

One such PN generator is disclosed in U.S. Pat. No. 6,154,101 entitled "FAST SLEWING PSEUDORANDOM NOISE SEQUENCE GENERATOR", assigned to the assignee of the present invention. This PN generator provides rapid slewing for PN sequences generated from a single linear feedback shift register (LFSR), such as those required for IS-95 and similar systems. This PN generator contains an LFSR and a reference counter, each of which is loadable. A free-running counter is used to maintain a reference time and the desired offset is added to that reference time to provide a target location. A look-up table is then accessed to find the PN state and PN count corresponding to the target location. If the table is fully populated, then the PN count is simply the target location, and the associated PN state is retrieved. If the table is not fully populated, the target location may not exist in the table. In this case, the closest PN count value with an associated PN state is located. The PN state and the PN count are then loaded simultaneously into the LFSR and the reference counter. Hence, the PN generator has now instantaneously slewed to the offset given by the difference between the free-running counter and the PN count value. In IS-95, the I and Q PN sequences are generating from a single LFSR using different masks. Thus, this technique inherently keeps the I and Q PN sequences aligned.

There may be some residual slewing required to get the PN generator exactly to the desired offset given by the target location. One reason for this is that, as stated above, the look-up table may contain only a subset of the possible PN states, and so the instantaneous-load slew only gets close to the target. Another reason is that there may be a slightly variable time delay between reading the free-running counter, accessing the look-up table, and loading the results. This residual slewing can be accomplished with the traditional slewing methods described previously.

The previously described technique works excellently for PN sequences that can be generated using a single LFSR. There are other classes of PN sequences which themselves are generated from other PN sequences, such as Gold codes. The W-CDMA standard is an example of a CDMA system which uses Gold codes for I and Q PN spreading. A Gold code is generated by summing (XORing) the output of two LFSRs. The traditional slewing technique of asserting or de-asserting the enable signal of the LFSRs to advance or retard works for Gold codes as well, but suffers the same system-limiting issues described above.

The generalized fast-slewing technique just described can grow prohibitively expensive when support for many unique codes is required. Such is the case with W-CDMA PN sequences. There are 512 primary codes to support, plus an additional 15 secondary codes for each primary code. There are also two 18-bit LFSRs, so 36 bits need to be stored for each potential target offset. The size of the look-up table needed to support this example can quickly become quite large if support for a reasonable number of target offsets per sequence is desired. Furthermore, there are synchronization issues that are introduced when one or more LFSRs need to be loaded simultaneously.

There is therefore a need in the art for improved fast-slewing multi-sequence PN generation techniques to increase system performance and minimize associated hardware overhead.

SUMMARY

Embodiments disclosed herein address the need for fast-slewing of multi-sequence based PN generators. In one aspect, LFSR states and reference counter states are loaded into their corresponding components such that consistency among the states is maintained. In another aspect, various methods for determining LFSR states and counter values in response to a desired offset in a unique code are disclosed. Among these methods are matrix-multiplication of LFSR states and generation of advanced LFSR states through masking techniques. Other methods are also presented. These aspects have the benefit of decreasing slew time in an efficient manner, which translates to increased acquisition speed, faster finger lock on multi-path signals, increased data throughput, decreased power, and improved overall system capacity. The techniques described herein apply equally to both access points and access terminals. Various other aspects of the invention are also presented.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
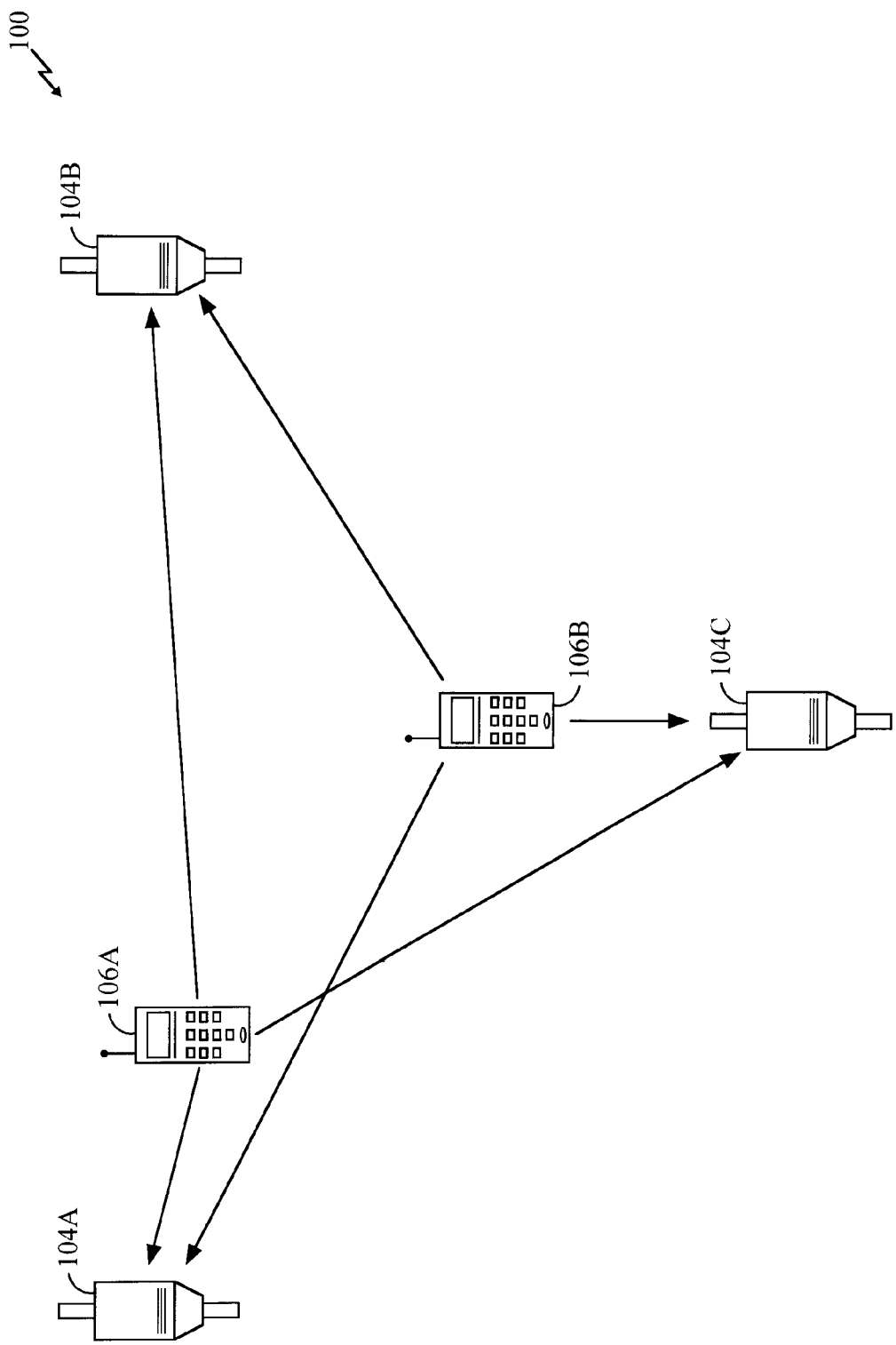
FIG. 1 is a general block diagram of a wireless communication system capable of supporting a number of users.

FIG. 1 is a diagram of a wireless communication system 100 that supports a number of users, and which can implement various aspects of the invention. System 100 may be designed to support one or more CDMA standards and/or designs (e.g., the IS-95 standard, the cdma2000 standard, the HDR specification). For simplicity, system 100 is shown to include three access points 104 (which may also be referred to as base stations) in communication with two access terminals 106 (which may also be referred to as remote terminals or mobile stations). The access point and its coverage area are often collectively referred to as a "cell".

Depending on the CDMA system being implemented, each access terminal 106 may communicate with one (or possibly more) access points 104 on the forward link at any given moment, and may communicate with one or more access points on the reverse link depending on whether or not the access terminal is in soft handoff. The forward link (i.e., downlink) refers to transmission from the access point to the access terminal, and the reverse link (i.e., uplink) refers to transmission from the access terminal to the access point.

For clarity, the examples used in describing this invention will assume access points as the originator of signals and access terminals as receivers and acquirers of those signals, i.e. signals on the forward link. Those skilled in the art would understand that access terminals as well as access points can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

The W-CDMA standard defines two Gold code sequences for scrambling the downlink, one for the in-phase component (I) and another for the quadrature (Q). The I sequence can be generated with two 18-bit LFSRs, the first using polynomial $1+X^7+X^{18}$, and the second using polynomial $I+X^5+X^7+X^{10}+X^{18}$. The I sequence is the XOR of tap 0 from each LFSR. The Q sequence is formed by delaying the I sequence by 131,072 chips. It can be generated with two more LFSRs, although skilled artisans will recognize that the two LFSRs used to generate the I sequences can be reused. This is accomplished by masking the two LFSRs, with respective masks of 001000000001010000 and 001111111101100000. The masked output of both LFSRs are summed using GF(2) addition, or more simply using XOR functions. The resultant summed mask outputs from the two LFSRs are XORed to form the Q sequence.

As mentioned previously, W-CDMA distinguishes base stations with unique codes. This is accomplished by utilizing unique sets of starting states in each of the two LFSRs. The PN sequences generated are then truncated to a length of 38,400 chips. The W-CDMA standard specifies primary and secondary codes, each with a unique starting state designated by an offset for the first LFSR and utilizes all ones for the starting state of the second LFSR. Thus the standard is simplified by requiring only one 18 bit initial state for each unique code rather than two 18 bit initial states, but the principles of the present invention apply equally to the more general case of two unique initial states per code. The present invention applies to the codes specified by the W-CDMA standard, and more generally to the generation of any PN sequence which is constructed based on the output of two or more sequences generated with unique LFSRs (or their equivalent).

Figure 2:
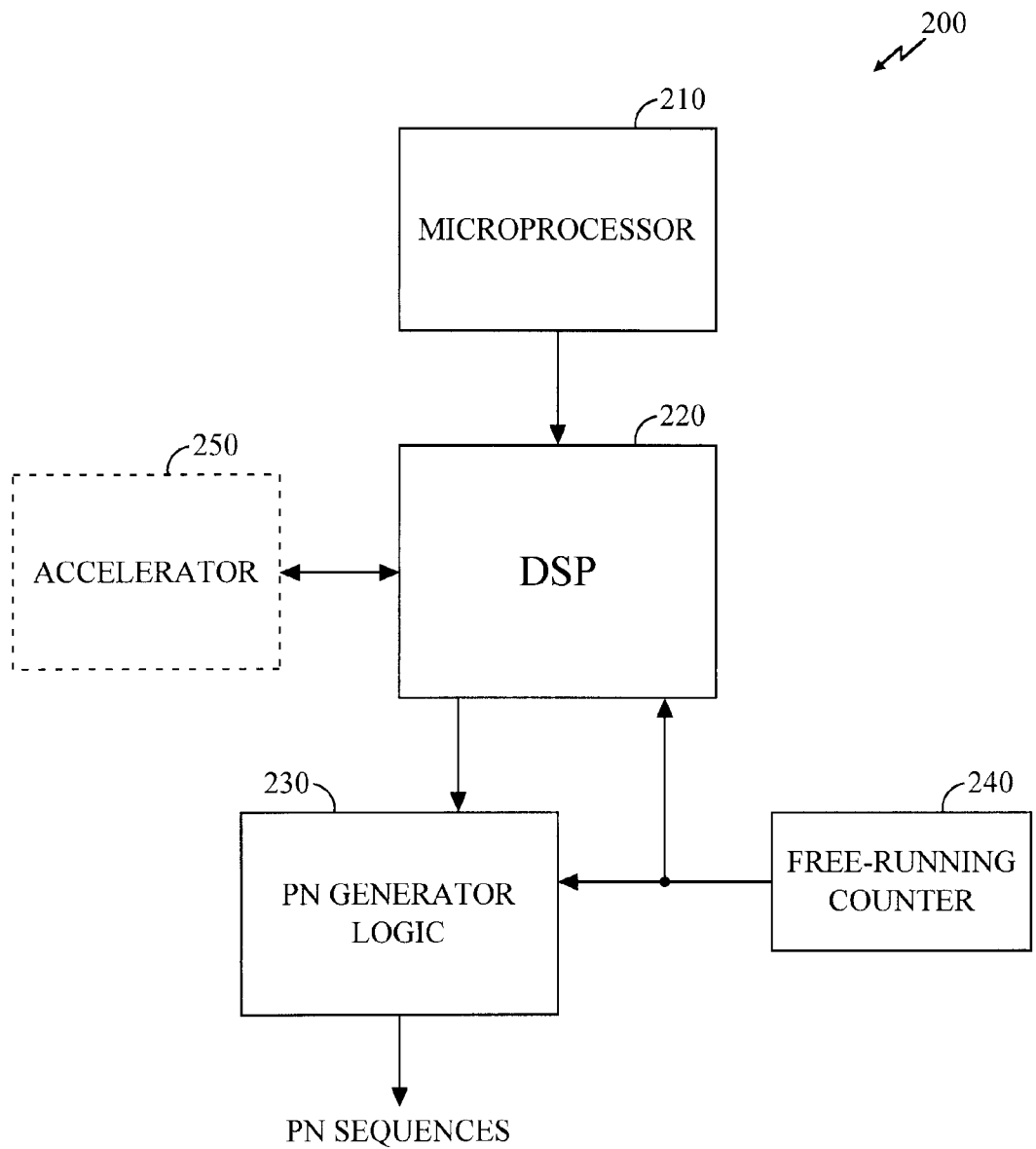
FIG. 2 depicts a block diagram of a receiver.

FIG. 2 depicts a block diagram of receiver 200 configured as one embodiment of the present invention. For clarity, only the subset of blocks of receiver 200 are shown that relate to the present invention. It is assumed for this discussion that microprocessor 210 is performing processing and control in general for receiver 200, and digital signal processor (DSP) 220 provides more specific control of various demodulation processing, including finger demodulation, searching, combining, and the like. These details are not shown. The portions of processing pertaining to slewing and PN generation are described in the following discussion. This assumed processing partition is for descriptive purposes only—those skilled in the art will recognize that various processing partitions among processors, whether microprocessors or DSPs, can be implemented in accordance with the principles of this invention.

Microprocessor 210 initiates slewing by delivering PN_CODE and TARGET_PN_POS to DSP 220. PN_CODE corresponds to the PN code of a particular base station that the PN sequences are to be generated to demodulate. In W-CDMA systems, PN_CODE will be an offset in the I sequence relative to the Q sequence, as described above. TARGET_PN_POS will identify an offset in the code identified by PN_CODE to which the PN generator must slew. Microprocessor 210 would typically determine the necessity for initiating slewing from results from a search process, or a system command delivering the offset and code for a neighboring base station in a handoff situation. These details, not shown, are outside the scope of the present invention.

DSP 220 carries out the slew directive from microprocessor 210 by delivering various parameters and a load command to PN generator logic 230. These parameters, and a variety of procedures for determining them are described in detail in the following discussion. In some of the procedures, accelerator 250 is used in conjunction with DSP 220 to develop some of the parameters. Accelerator 250 is drawn with a dashed line to indicate that it is optional.

Free-running counter 240 is a counter which increments once per chip with a periodicity determined by the length of the PN sequences being generated and used for descrambling. In W-CDMA systems, that period is 38,400 chips. When the system is initialized, this counter is reset and subsequently cycles indefinitely. Its output is used to provide a timing reference. Both DSP 220 and PN generator logic 230 have access to the timing reference of free-running counter 240.

Figure 2A:
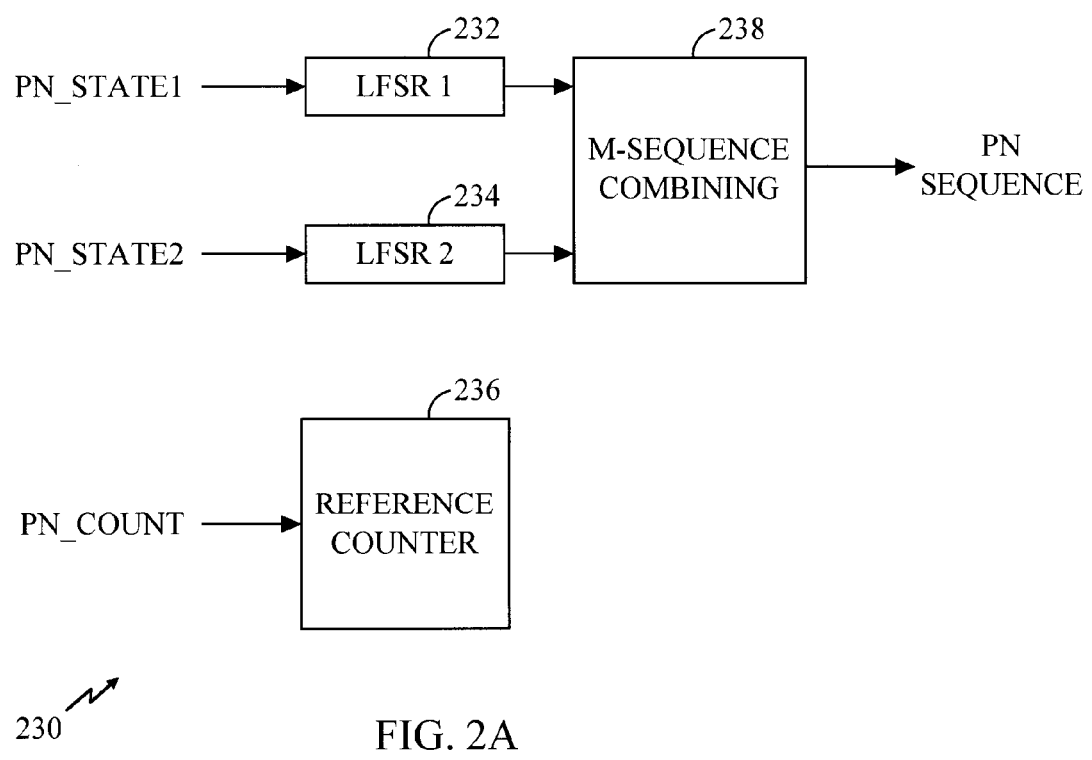
FIG. 2A depicts generalized PN generator logic.

FIG. 2A depicts a generalized embodiment of PN generator logic 230. PN generator logic 230 will be detailed more fully in the discussion relating to FIG. 3, FIG. 5, and the description of the variety of parameter-determining procedures described below. PN generator logic 230 contains two LFSRs, named LFSR1 232 and LFSR2 234, each of which generate a PN sequence known as an M-sequence. The desired output of PN generator logic 230 is one or more PN sequences which are constructed from those two M-sequences, determined in M-sequence combining block 238. Typically, in CDMA systems, an I PN sequence and a Q PN sequence are the desired outputs. The desired outputs for a W-CDMA sequence have been described in detail above.

The generation of any particular PN sequence in M-sequence combining block 238 naturally requires that LFSR1 232 and LFSR2 234 have coordinated states. Thus, for a particular PN sequence output, LFSR1 232 and LFSR2 234 must update synchronously. Typically, the LFSRs update once per chip. If they do not update synchronously, then a different PN sequence from the one desired will result. To that end, PN generator logic 230 also contains reference counter 236, which updates synchronously with the two LFSRs, and its output provides a reference which indicates the position or index of the state of each M-sequence and thus index or position of the resultant PN sequence coming out of M-sequence combining block 238. It will be evident to those of skill in the art that the principles of the present invention apply with full force when more than two LFSRs are used in generation of the PN output, but efficient description of these principles requires only two LFSRs in the discussion of the various techniques and embodiments.

As shown in FIG. 2A, PN_STATE1, PN_STATE2, and PN_COUNT are inputs to LFSR1 232, LFSR2 234, and reference counter 236, respectively. Each of these three components can be loaded with these respective inputs, temporarily overriding the inherent LFSR or counter behavior of the components. In this manner, the reference count, M-sequences, and resulting PN sequence can be instantaneously moved to a new location, or, in other words, instantaneously slewed. It will be clear to those skilled in the art that writing of PN_STATE1, PN_STATE2 and PN_COUNT must be done in such a way that consistency among those values is maintained. There are a variety of ways to accomplish this. One way is to make sure all values are written within a time period in which neither the counter nor LFSRs will advance. Another is to disable the counter and LFSRs while the values are loaded. Yet another is to pre-compensate for any skew that is introduced during the writing sequence such that after all the values are loaded they have the relative relationship that was intended. (Alternative embodiments do not require instantaneous synchronicity between LFSR1 and LFSR2, but will provide a method and/or apparatus for converging back to the synchronous state. These embodiments are not inconsistent, as their resultant output will not be the valid desired outputs until synchronization is reached. Detailed discussion of this is given below with respect to FIG. 5.)

Referring back to FIG. 2, the three inputs, PN_STATE1, PN_STATE2 and PN_COUNT, are among the parameters passed from DSP 220 to PN generator logic 230. Calculating these according to the synchronicity requirements just described will be the discussion of the various parameter calculation methods that follow. (For the alternative embodiments, discussed briefly above and more fully below, which do not meet the instantaneous synchronicity requirement, PN_COUNT may need to be passed in two parameters, PN_COUNT1 and PN_COUNT2, to correspond with the indexes or positions in accordance with PN_STATE1 and PN_STATE2, respectively.)

In addition to these three, a variety of other parameters may need to be passed, depending on the particular implementation. For truncated sequences, the LFSRs are not allowed to cycle through the entire sequence dictated by the polynomials contained therein. Thus, LFSR1_INIT_STATE and LFSR2_INIT_STATE may need to be provided to determine the proper re-starting state of the respective LFSRs once the end of the truncated sequence is reached. As stated above, W-CDMA systems always use the all ones starting state to load into LFSR2, so only LFSR1_INIT_STATE needs to be passed. As is often the case, the instantaneous portion of the slew may not completely accomplish the desired slew, and so passing a parameter with the desired final slewed position, TARGET_PN_POS, is useful for performing any necessary residual slew. In various embodiments, a number of features may contain other programmable elements, which naturally will need to be initialized (either by DSP 220 or microprocessor 210). In general these parameters are relatively static in relation to the slewing procedure. They will be described as appropriate when introduced below.

The generalized procedure for slew processing in DSP 220, following the slew command issued by microprocessor 210, is as follows.

First, DSP 220 receives a slew command from microprocessor 210. The command includes a PN code identifier, PN_CODE, which identifies the PN code to be generated, and a target PN position, TARGET_PN_POS, which indicates the index or position in the PN code to which slewing is desired. PN_CODE is needed when unique code sequences must be generated and identified. For example, as discussed above, one such class of codes includes those based on truncated M-sequences. However, other classes of codes based on a plurality of LFSR outputs are equivalently within the scope of the present invention. Those skilled in the art will know how to modify the principles in the following discussion to compensate for this.

Second, DSP 220 reads free-running counter 240 to determine the free-running reference time at that instant, referred to as FREE_COUNT. DSP 220 then adds TARGET_PN_POS to FREE_COUNT to determine the desired PN count, PN_COUNT, which will be loaded into reference counter 236. Reference counter 236 maintains a reference time specific to PN counter 230, not to be confused with free-running reference time FREE_COUNT. Any given embodiment may employ numerous PN counters, each maintaining different offsets and hence different values in their respective reference counters. In such embodiments, only a single free-running reference counter is required. In a typical system, there may be some delay in performing these calculations, so PN_COUNT may have an error component based on counter and LFSR updating which occurred during that delay.

Third, based on PN_CODE and PN_COUNT, DSP 220 determines the states for loading into LFSR1 and LFSR2, PN_STATE1 and PN_STATE2 respectively, which correspond to the desired count value (PN_COUNT) in the code (identified by PN_CODE). Various procedures for determining PN_STATE1 and PN_STATE2 will be discussed in detail below.

Fourth, PN_COUNT, PN_STATE1 and PN_STATE2 are loaded into reference counter 236, LFSR1 232, and LFSR2 234, respectively. These values are loaded in such a way that consistency among them is maintained, using methods such as those previously described. This accomplishes an instantaneous slew to the position identified by PN_COUNT.

Fifth, any residual slewing is accomplished by slewing logic (detailed in FIG. 3 below) to bring PN generator 230 output to the position identified by TARGET_PN_POS. This may be accomplished by DSP 220 writing TARGET_PN_POS to PN generator logic 230.

Figure 3:
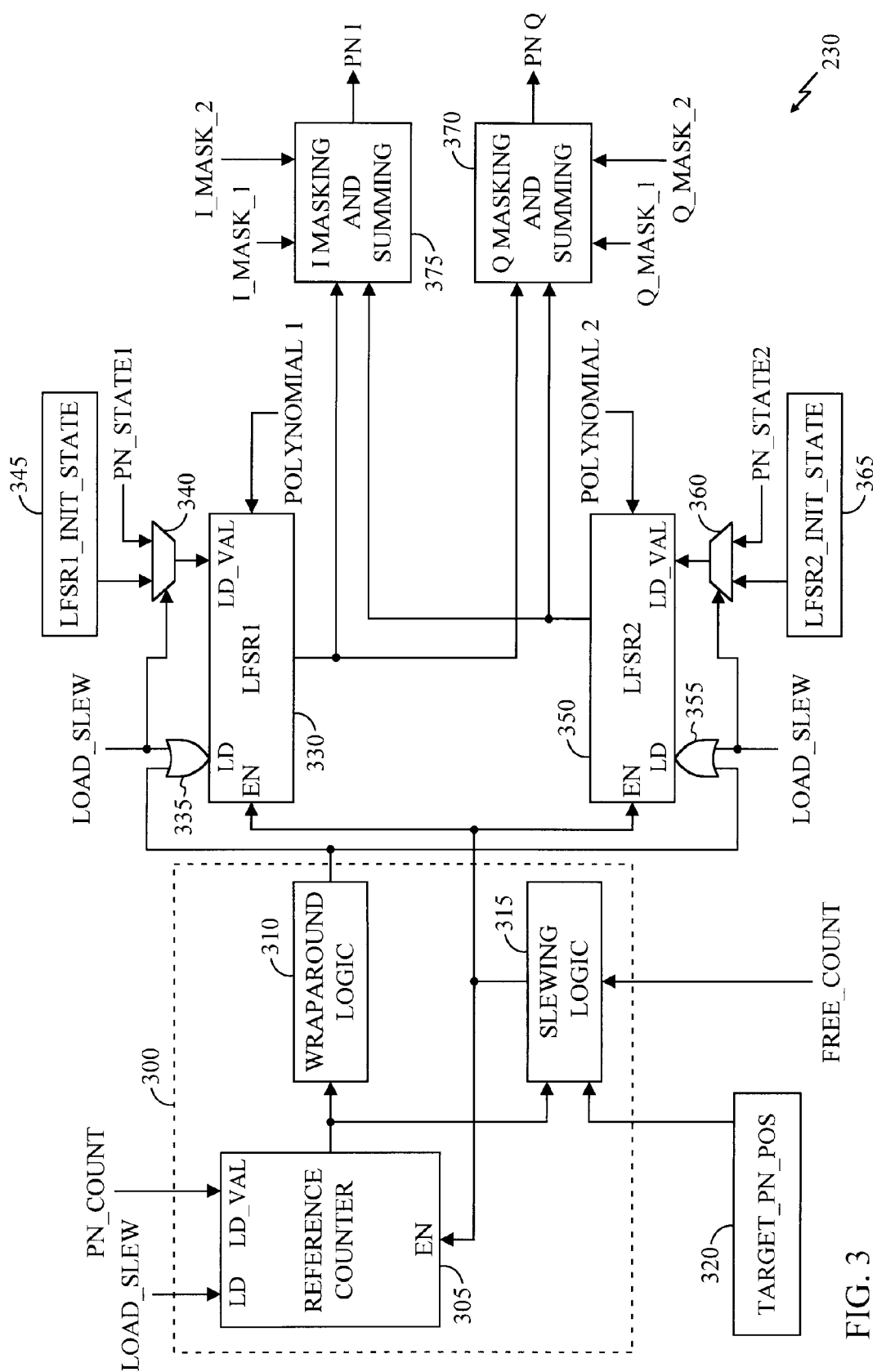
FIG. 3 is an embodiment of PN generator logic configured in accordance with the present invention.

FIG. 3 depicts an embodiment of PN generator logic 230. There is a high degree of configurability shown for illustrative purposes. There are a variety of embodiments of PN generator logic 230 that do not require all the configurable parameters to be programmable. Instead, many of the parameters will be fixed in hardware.

PN generator logic 230 contains two LFSRs, LFSR1 330 and LFSR2 350. LFSR1 330 and LFSR2 350 show input parameters labeled POLYNOMIAL1 and POLYNOMIAL2, respectively. In some embodiments, it may be advantageous to allow the polynomial of each LFSR to be programmable, particularly where a PN generator is deployed for use in a variety of communication standards. The W-CDMA standard directs that POLYNOMIAL1 be $1+X^{17}+X^{18}$, and POLYNOMIAL2 be $1+X^5+X^7+X^{10}+X^{18}$. These may be hard coded or made programmable.

Each LFSR is shown with an enable signal, labeled en, a load signal, labeled ld, and a load value signal, labeled ld_val. The enable signal, when asserted, allows each LFSR to update to the next state. When enable is de-asserted, each LFSR remains in its current state. The load signal, ld, when asserted, overrides the customary LFSR updating, and causes the value on the input ld_val to be written into the LFSR's current state.

Reference counter 305 is shown with the identical three signals: en, ld, and ld_val. Precisely the same behavior takes place in reference counter 305 in response to assertions of these signals. Naturally, the only difference is that reference counter 305 cycles through states incrementing by one until a terminal value is reached (and the state is reset). The LFSRs cycle through states dictated by the polynomials chosen. Note that the en signal of each LFSR 330 and 350, as well as that of reference counter 305 are all connected. Therefore, reference counter 305 provides a value that is an index of the current state of the LFSRs, as all three update simultaneously.

There are two ways that values can be written into the two LFSRs. As shown, the output of OR gates 335 and 355 are connected to the ld signal of LFSR1 330 and LFSR2 350, respectively. When either input to OR gate 335 or 355 is asserted, a load will take place. One input to OR gates 335 and 355 is an input signal called LOAD_SLEW, and it is also connected to the ld signal of reference counter 305. LOAD_SLEW also connects to muxes 340 and 360 to control the input to ld_val on LFSR1 330 and LFSR2 350, respectively. When LOAD_VAL is asserted by DSP 220, PN_COUNT is loaded into reference counter 305, PN_STATE1 is selected by mux 340 and loaded into LFSR1 330, and PN_STATE2 is selected by mux 360 and loaded into LFSR2 350. This is the method used for instantaneous slew, as described above, and all the loads occur simultaneously.

Dashed box 300 is drawn around reference counter 305, wraparound logic 310, and slewing logic 315 to contrast with the corresponding box in FIG. 5 below. The distinction will be described in the discussion with respect to FIG. 5 below.

The second way that values are written into the LFSRs is when wraparound logic 310 has determined that the final state in the sequence has been reached, and the initial state is to be loaded in. The initial states are stored by DSP 220 into registers 345 and 365, and labeled LFSR1_INIT_STATE and LFSR2_INIT_STATE, respectively. This feature is needed only when the M-sequences generated in LFSR1 330 and LFSR2 350 are truncated. Otherwise, the initial state would always roll around naturally at the end of the period. As mentioned above, W-CDMA systems use truncated M-sequences—the natural length of an 18 bit LFSR sequence is (2^18)−1, or 262,143 chips, but the actual sequence generated is truncated to 38,400. Although reference counter 305 does not show a corresponding alternate input to ld_val, it is understood that counters roll over to 0 once they have reached their terminal value. In a W-CDMA system, reference counter 305 would roll over after 38,400 chips were counted. Since 38,400 is not a power of two, a typical counter implementation would check for the value 38,399 and roll the state over to zero at the next enabled clock cycle. If the circumstances called for it, reference counter 305 could be modified to allow loading of a programmable initial state. Wraparound logic 310 determines when the terminal state has been reached and asserts the signal that, through OR gates 335 and 355, loads LFSR1_INIT_STATE and LFSR2_INIT_STATE into LFSR1 330 and LFSR2 350, respectively. The same logic may be shared with reference counter 305 to determine when to reset.

As mentioned previously, W-CDMA systems always load all ones into LFSR2 for its initial state, corresponding to the first chip of the radio frame, so the programmability of register 365 may not be necessary. (Note that LFSR1_INIT_STATE and LFSR2_INIT_STATE are not, in general, the states used to initialize the LFSRs when performing the fast-slewing operation. Often the fast-slew operation will be performed in the middle of a radio frame.) The values programmed into LFSR1_INIT_STATE determine the offset in the LFSR1 M-sequence. Since LFSR2 is always initialized with all ones, it is the LFSR1_INIT_STATE that determines the unique code generated. There are 512 unique primary codes, each of which implements an offset in the LFSR1 M-sequence. Each of the 512 primary codes has a corresponding LFSR1_INIT_STATE. Similarly, there are 15 secondary codes for each primary code, again, each with unique LFSR1_INIT_STATEs.

The outputs of LFSR1 330 and LFSR2 350 are each connected as inputs to I masking and summing block 375 and Q masking and summing block 370. I masking and summing block 375 is shown with programmable variables I_MASK_1 and I_MASK_2. Q masking and summing block 370 is shown with programmable variables Q_MASK_1 and Q_MASK_2. In general, I_MASK_1 is applied to the output of LFSR1 330, Q_MASK_2 is applied to the output of LFSR2 350, and the results are summed (GF(2)) in I masking and summing block 375 to produce the output PN sequence labeled PNI. Similarly, Q_MASK_1 is applied to the output of LFSR1 330, Q_MASK_2 is applied to the output of LFSR2 350, and the results are summed (GF(2)) in Q masking and summing block 370 to produce the output PN sequence labeled PNQ. The masks may be hard coded for a given system, and hence may not need to be programmable. Although an I and a Q sequence are generally desired in CDMA systems, the principles of the present invention work equally when only a single PN sequence output is required. In that case, either block 375 or block 370 could be deleted, along with the corresponding output. In W-CDMA, no masking takes place in I masking and summing block 375, simply the least significant bit from LFSR1 330 and LFSR2 350 are summed GF(2) (or more simply XORed) to produce PNI. To produce PNQ, Q_MASK_1 is set to 001000000001010000 and Q_MASK_2 is set to 001111111101100000. The resultant masked outputs are then summed GF(2) two to produce PNQ.

Slewing logic 315 takes the output of reference counter 305, TARGET_PN_POS (written to register 320 by DSP 220), and the output of free-running counter 240, FREE_COUNT, as its inputs. When its output (connected to the enable signal on reference counter 305, LFSR1 330, and LFSR2 350) is asserted, the LFSRs and reference counter 305 update to their next state (wrapping around if necessary). When no slewing is required, this enable signal is asserted once per chip. When a slew command is issued to slewing logic 315 (details not shown), the timing can be advanced by inserting more than one enable per chip, or retarded by removing the enable. Slewing logic 315 can advance or retard until the difference between reference counter 305 output and FREE_COUNT equals TARGET_PN_POS, thus signifying that the slew has been completed. Note that during traditional slow slewing, advancing is, typically, faster than retarding, as only one enable can be removed per chip so the maximum retard rate is one chip per chip time. Advancing can be accomplished by leaving the enable asserted continuously, and the maximum advance rate is determined by the underlying clock speed. Many systems operate at 8 times the chip rate, or chip×8, and so advancing would occur at a maximum rate of 7 chips per chip time. Clearly, higher clock rates will yield higher maximum advance rates. Other embodiments may support only one direction, either advance or retard, for simplicity.

Now various procedures for determining PN_STATE1 and PN_STATE2 for a corresponding PN_COUNT and PN_CODE will be described. One or more of these procedures can be combined to accomplish the third step of the generalized procedure for slew processing in DSP 220, described previously. The fifth step, residual slew, will also be incorporated with one of these procedures or a combination thereof.

The first procedure will be defined as slow slew. It is the least effective in terms of increased slew speed when used by itself. It is the default method for providing the residual slew described as the fifth step above. Slow slew is accomplished by simply writing any valid combination of PN_STATE1, PN_STATE2 and PN_COUNT corresponding to the desired sequence identified by PN_CODE into their respective components, followed by a write of TARGET_PN_POSITION. The slewing logic described in block 315 of FIG. 3 then simply slews at the rates described until TARGET_PN_POSITION is reached. One valid combination for a W-CDMA system is to set PN_STATE1 to LFSR1_INIT_STATE, PN_STATE2 to the all ones state, and PN_COUNT to zero. Then the slewing logic can advance at the maximum advance rate until TARGET_PN_POSITION is reached. (Alternatively, the slewing logic could retard until TARGET_PN_POSITION is reached.)

A second procedure for determining PN_STATE1 and PN_STATE2 for a corresponding PN_COUNT and PN_CODE will utilize a matrix multiplier as a hardware accelerator (corresponding to optional accelerator 250 in FIG. 2). As commonly known in the art, an M bit LFSR in a Fibonacci configuration generates its next state by operating on its current state in the following manner. Bits M−1 through 1 will be right shifted into positions M−2 through 0. Bit M−1 will be the result of the polynomial operation (XORing the corresponding tap positions) on the current state. To understand how matrix multiplication can be utilized for PN generation, consider the following definitions:

M=the number of bits in the LFSR;

$X_n(i)$=the state of the $i^{th}$ element of LFSR X at state n;

$X_n$=an M bit column vector corresponding to the current LFSR state, $[X_n(0)X_n(1) \ldots X_{n(M-2)}X_n(M-1)]$ $X_{n+1}$=an M bit column vector corresponding to the next LFSR state, $[X_{n+1}(0)X_{n+1}(1) \ldots X_{n+1}(M-2)X_{n+1}(M-1)]$ A=an M×M matrix such that $X_{n+1}=A X_n$;

Matrix A can be constructed as follows. The first M−1 rows are created with the first column set to all zeros and the next M−1 columns set to an M−1×M−1 identity matrix. This corresponds to the general LFSR shifting of bits M−1 through 1 into bits M−2 through 0. The $M^{th}$ row is simply the vector representation of the polynomial. This corresponds to the general LFSR performing the polynomial operation on the current state and placing the result in bit M.

Thus, multiplying matrix A by an LFSR state ($X_n$) will result in the next LFSR state ($X_{n+1}$), or an advance of one. Multiplying matrix A by matrix A will result in matrix $A^2$, and $X_{n+2}=A^2X_n$, or an advance of 2 in one cycle. Multiplying matrix $A^2$ by matrix A will result in matrix $A^3$, and $X_{n+3}=A^3X_n$, or an advance of 3 in one cycle, and so on. To increment any LFSR state by k chips in a single cycle, a matrix $A^k$ can be calculated such that $X_{n+k}=A^kX_n$.

The matrix multiplication can also be repeated for two or more cycles. If the results of a matrix multiplication in one cycle are again multiplied by the $A^k$ matrix in a second cycle, the results will be $X_{n+2k}=A^{2k}X_n$. In general, if the matrix multiplication by matrix $A^k$ is repeated r times, the advance in r cycles will be $X_{n+rk}=A^{rk}X_n$.

Figure 4:
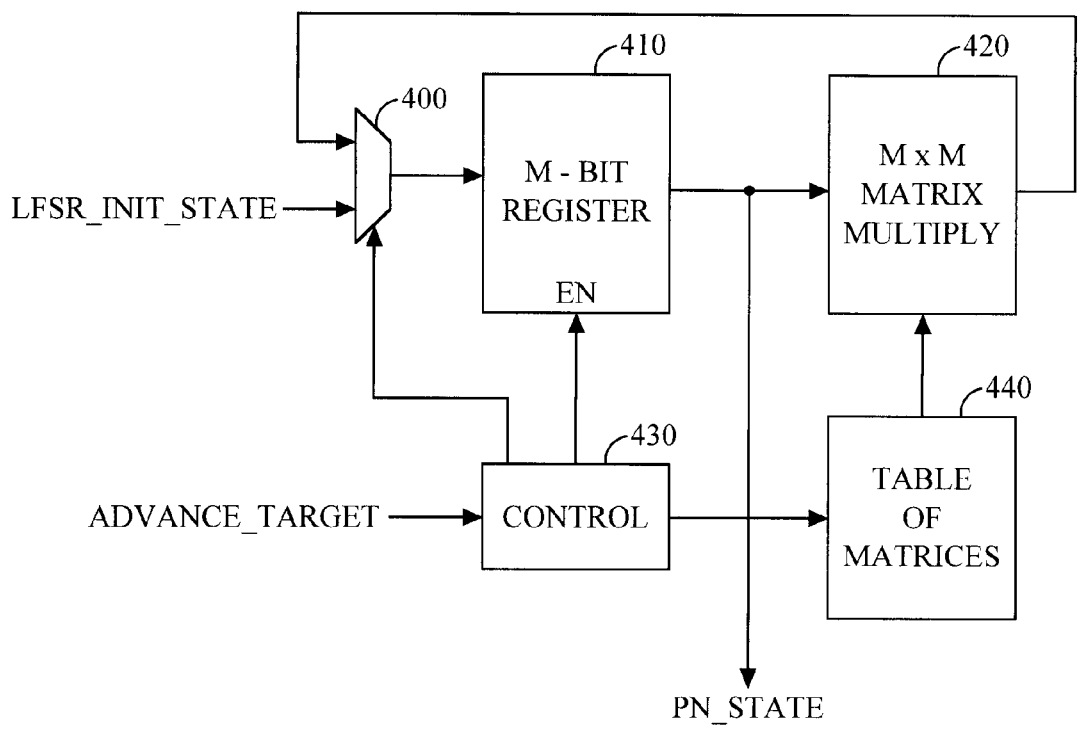
FIG. 4 is a matrix multiplier configurable as a hardware accelerator for calculating LFSR states.

Thus, hardware accelerator 250, configured with a matrix multiplier, can be utilized by DSP 220 to rapidly calculate PN_STATE1 and PN_STATE2 for any offset determined in accordance with PN COUNT and PN CODE. FIG. 4 depicts one embodiment of such a matrix multiplier, configurable as accelerator 250. The most flexible architecture of accelerator 250 will be an M×M matrix multiplier 420 where the matrix is programmable. Table of matrices 440 contains a number of pre-computed matrices with varying single-cycle advance parameters k. Control 430 accesses a particular matrix with a desired k in table of matrices 440 by selecting it with a corresponding index. M-bit register 410 is equipped to receive the input LFSR_INIT_STATE or the output of M×M matrix multiplier 420 through mux 400 under direction of control 430. M-bit register 410 provides the vector upon which M×M multiplier 420 multiplies the matrix selected by control 430 in table of matrices 440.

The process to compute PN_STATE1 and PN_STATE2 is as follows. To begin the process, control 430 receives ADVANCE_TARGET. For sequences, such as those described in the W-CDMA standard, ADVANCE_TARGET will be determined by adding PN_COUNT to the delay associated with the specific code, given by PN_CODE in the description above. For other classes of sequences, ADVANCE_TARGET may simply be PN_COUNT. Control 430 determines the appropriate combination of k and r to produce ADVANCE_TARGET. First, the load value for LFSR1 will be determined, PN_STATE1. Supply LFSR1_INIT_STATE through LFSR_INIT_STATE into mux 400. Control 430 then selects LFSR_INIT_STATE in mux 400 and enables M-bit register 410 to store it. Control 430 selects a matrix from Table of matrices 440 for populating M×M matrix multiply 420. The resultant output from M×M matrix multiply is the value in M-bit register 410 advanced by k states. Control 430 then selects this result through mux 400 and enables M-bit register 410 to store it. This process can be repeated r times to produce a result that is r*k states advanced from the value supplied as LFSR_INIT_STATE. The result is the output of M-bit register 410, labeled PN_STATE.

There are myriad combinations of the k values corresponding to matrices in table of matrices 440 and r values for each. In general, there are K unique matrices stored with k values given by $k_1, k_2, \ldots k_K$ and K corresponding repeat values r (where r can be zero if a matrix is not to be used) given by $r_1, r_2, \ldots r_K$. Thus, LFSR_INIT_STATE will be advanced in this procedure by $A=r_1*k_1, r_2*k_2, \ldots r_K*k_K$, ideally resulting in an offset of ADVANCE_TARGET. Thus, the result will be the proper PN_STATE1 corresponding to PN_COUNT. The above procedure is then repeated with LFSR2_INIT_STATE (all ones in the W-CDMA standard) to produce the proper PN_STATE2 corresponding to PN_COUNT.

In some configurations, due to limitations on the number of k values supported, the advance value a may not equal ADVANCE_TARGET. In these cases, there will be a residual value given by ADVANCE_TARGET−A. The resulting PN_STATE1 and PN_STATE2 will not correspond to PN_COUNT, but to a count determined by the difference between ADVANCE_TARGET and the advance value A. In these configurations, the slow slew procedure described above can be used to accomplish the residual slew after PN_STATE1, PN_STATE2 are written into their respective LFSRs and PN_COUNT+(A−ADVANCE_TARGET) is written into its counter to produce the instantaneous slew described above.

FIG. 4 contains control 480 for providing r calculations, matrix selection, mux control, and register enabling. It also contains table of matrices 440. Those skilled in the art will recognize that these block delineations are for discussion purposes only. Either or both of these blocks could be contained in DSP 220.

The embodiment of FIG. 4 can be further simplified if multiple matrices are not required to get the desired level of slewing speed. If a single matrix is selected with a certain advance parameter k, then table of matrices 440 can be removed and M×M matrix multiply 420 need not be programmable. This greatly simplifies the hardware. Various repeat values, r, can still be employed to provide advances of integer multiples of k. As before, residual slew due to differences between ADVANCE_TARGET and r*k can be accommodated in PN generator logic 230 using the slow slew procedure described above.

An alternate embodiment utilizing the principles of the matrix multiplier accelerator is to subsume PN generator logic 230 into accelerator 250. Thus, a matrix multiplier accelerator is deployed for each PN generator required. This scheme has the potential to simplify the DSP's tasks, but comes with a significant hardware cost.

A third procedure for determining PN STATE1 and PN_STATE2 for a corresponding PN_COUNT and PN_CODE is to perform matrix multiplication in software, similar to the hardware accelerator procedure just described with relation to FIG. 4. DSP 220 would contain a look-up table of several M×M matrices, corresponding to various advance values. The procedure for determining PN_STATE1 and PN_STATE2 is essentially identical to the hardware version, except that the procedures will be carried out in DSP 220. Any residual slew remaining after the software matrix multiplications are completed can be carried out in PN generator logic 230 using the slow slew procedure described above. In either the hardware or software versions of the matrix multiply procedure, there is a tradeoff between increased storage requirements for matrices and increased slew time by utilizing the soft slew procedure to provide any residual slew.

A fourth procedure for determining PN_STATE1 and PN_STATE2 for a corresponding PN_COUNT and PN_CODE is to utilize a look-up table (LUT), indexed on PN_COUNT, for each unique code. The most complete embodiment would require a completely populated LUT for every unique code, with a number of entries in each LUT corresponding to the number of chips in each sequence. This would clearly become very memory intensive, and so less expensive alternatives will often be desirable.

The LUT approach for W-CDMA systems can be simplified. Since LFSR2 is always initiated with all ones, and that same sequence of 38,400 chips is used for every code, only one LUT, indexed on PN_COUNT, needs to be deployed to determine PN_STATE2 (call this LUT2). To reduce the amount of hardware required, a subset of the 38,400 possible states can be stored in LUT2. For example values of PN_COUNT spaced 16 chips apart may provide the appropriate hardware/granularity balance. LUT2 will contain the corresponding PN_STATE2 for every PN_COUNT in the set defined as [0, 16, 32, 48, . . . , (38400−16)].

Recall that in the W-CDMA standard, LFSR1 uses the same polynomial and simply truncates the M-sequence in different positions based on unique starting offsets to produce the unique codes. As such, a single LUT, called LUT1, indexed on PN_COUNT can also be used to determine PN_STATE1. However, LUT1 will be larger than 38,400 entries, since each of the 512 primary codes begins at offsets spaced 16 chips apart, and therefore each code ends at some multiple of 16 past the $38,400^{th}$ chip. Correspondingly, each secondary sequence is offset between 1 and 15 chips from its primary sequence. LUT1, if populated every $16^{th}$ chip as described above for LUT2, will contain the corresponding PN_STATE1 for every PN_COUNT in the set defined as [0, 16, 32, 48, . . . , (38400-16+512*16)]. Thus, the full index for LUT1 is PN_COUNT plus the offset identifying the unique sequence number (PN_CODE). This example, LUT1 and LUT2 populated with every $16^{th}$ value, fully supports the primary scrambling codes required by W-CDMA systems. However, additional operations would be needed to support secondary scrambling codes.

In the previous examples, LUT1 and LUT2 contained LFSR state values for every PN_COUNT that is an integer multiple of 16. Therefore, for any supported PN_COUNT, there is a pair of LFSR state values to determine PN_STATE1 and PN_STATE2. LUT1 and LUT2 can be used to support slewing of any PN_COUNT by looking up the closest supported value to PN_COUNT for a particular PN_CODE, retrieving the corresponding PN_STATE1 and PN_STATE2, writing the three values to their respective components to perform instantaneous slew, and completing any residual slew according to the slow slew process described above.

However, an issue arises if the PN_COUNT values supported in LUT1 are not the same as those supported in LUT2. As discussed previously, PN_STATE1, PN_STATE2, and PN_COUNT are all to be written to their respective components simultaneously (or utilizing other techniques for maintaining consistency among them), and thus PN_STATE1 and PN_STATE2 should correspond to the sequence position given by PN_COUNT. In the configuration at hand, the closest states available in LUT1 and LUT2 are for different PN_COUNTs. Should the need for this configuration arise, there are a number of ways to resolve the issue.

Figure 5:
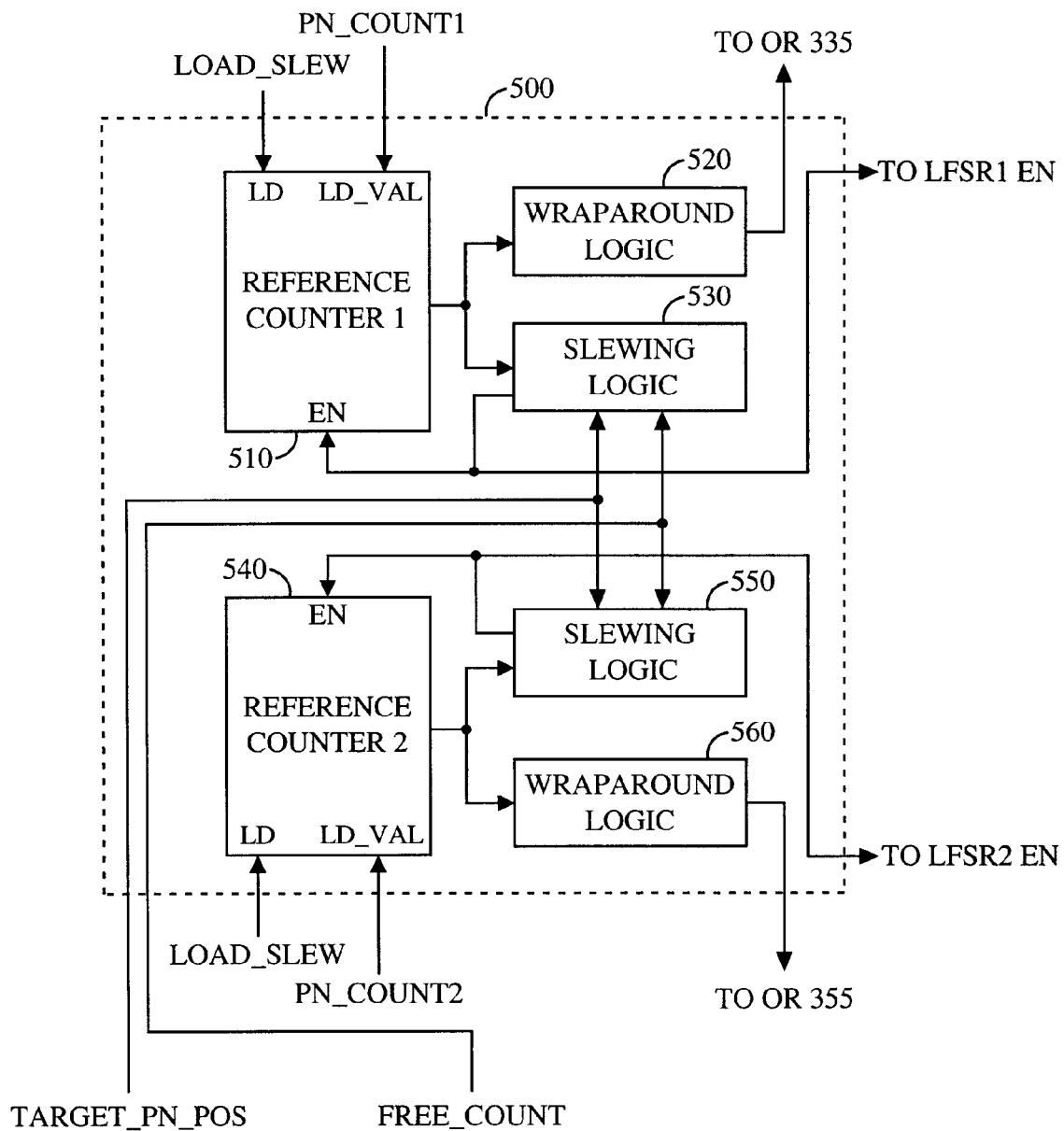
FIG. 5 depicts a modification to the PN generator logic of FIG. 3.

One resolution is shown in FIG. 5. FIG. 5 shows a dashed outline of block 500, which is a replacement for block 300 in FIG. 3. The description of FIG. 3 remains valid with this modification, except that instead of loading reference counter 305 with PN_COUNT, there are two reference counters for each LFSR, reference counter 1 510 and reference counter 2 540, which are loaded with PN_COUNT1 and PN_COUNT2, respectively. PN_COUNT1 and PN_COUNT2 are the PN_COUNT values from LUT1 and LUT2 that were closest to the desired PN_COUNT, and PN_COUNT1 and PN_COUNT2 correspond directly with PN_STATE1 from LUT1 and PN_STATE2 from LUT2, respectively. With the modification shown in FIG. 5, LOAD_SLEW causes both PN_COUNT1 and PN_COUNT2 to be written, and separate wraparound logic, 520 and 560, and slewing logic, 530 and 550, independently slew LFSR1 and LFSR2 accordingly. The output of wraparound logic 520 drives the corresponding input to OR 335. Slewing logic 530 drives the enable to reference counter 1 510, as well as the enable of LFSR1 330. The output of wraparound logic 560 drives the corresponding input to OR 355. Slewing logic 550 drives the enable to reference counter 2 540, as well as the enable of LFSR2 350.

Both slewing logic blocks 530 and 550 continue to monitor FREE_COUNT and TARGET_PN_POS, and eventually the difference in PN_COUNT between PN_STATE1 and PN_STATE2 that was introduced because LUT1 and LUT2 did not have entries for identical PN_COUNT values will be slewed away through independent use of the slow slew procedure by LFSR1 and LFSR2 and their associated circuitry. Note that the output sequence of PN generator logic 230 will not be the valid PN sequence desired until these two residual slews are completed. It may be useful for the slewing logic blocks to provide a signal to the rest of the circuit (or DSP or microprocessor) indicating whether or not the slew operation is complete.

As an alternative to the hardware modification detailed in FIG. 5, DSP 220 can perform the residual slew itself in software using the state and count values for either LFSR1 or LFSR2, and its corresponding polynomial. Essentially, DSP 220 mimics the LFSR hardware and performs the number of cycles required to advance either the LFSR1 or LFSR2 values until the two are in accordance with each other. This is analogous to performing the slow slew procedure in software, but instead of the residual slew being performed, the offset difference between the states given by LUT1 and LUT2 is removed.

A fifth procedure for determining PN_STATE1 and PN_STATE2 for a corresponding PN_COUNT and PN_CODE is as follows. It is well known in the art that a mask can be applied to an LFSR state such that the mask is bitwise ANDed with the LFSR state and the bitwise AND result is XORed to produce a value that is delayed from the output value of the LFSR by an amount corresponding to the mask chosen. It is also a property of a Fibonacci configuration of an M-bit LFSR that the M bits contained in the LFSR register elements at any time correspond to the next M outputs of the LFSR, since the output is fed back to the most significant bit M−1, and bits M−1 through 1 are right shifted into positions M−2 through 0 in each successive LFSR operation. The principle of this procedure is that if an M-bit LFSR, loaded with a first state, is cycled M successive times, a masked version of the output as described above will produce the M state bits corresponding to the advanced state of the LFSR if the proper mask is chosen.

So, to find PN_STATE1 for a given PN_COUNT within an identified code, an LFSR can be loaded with LFSR1_INIT_STATE, masked with mask corresponding to the delay of PN_COUNT+PN_CODE, and cycled M times to produce the M bits for PN_STATE1 corresponding to PN_COUNT. The process can be repeated with LFSR2_INIT_STATE to produce the M bits for PN_STATE2 corresponding to PN_COUNT. This procedure can be implemented with hardware or in software.

Figure 6:
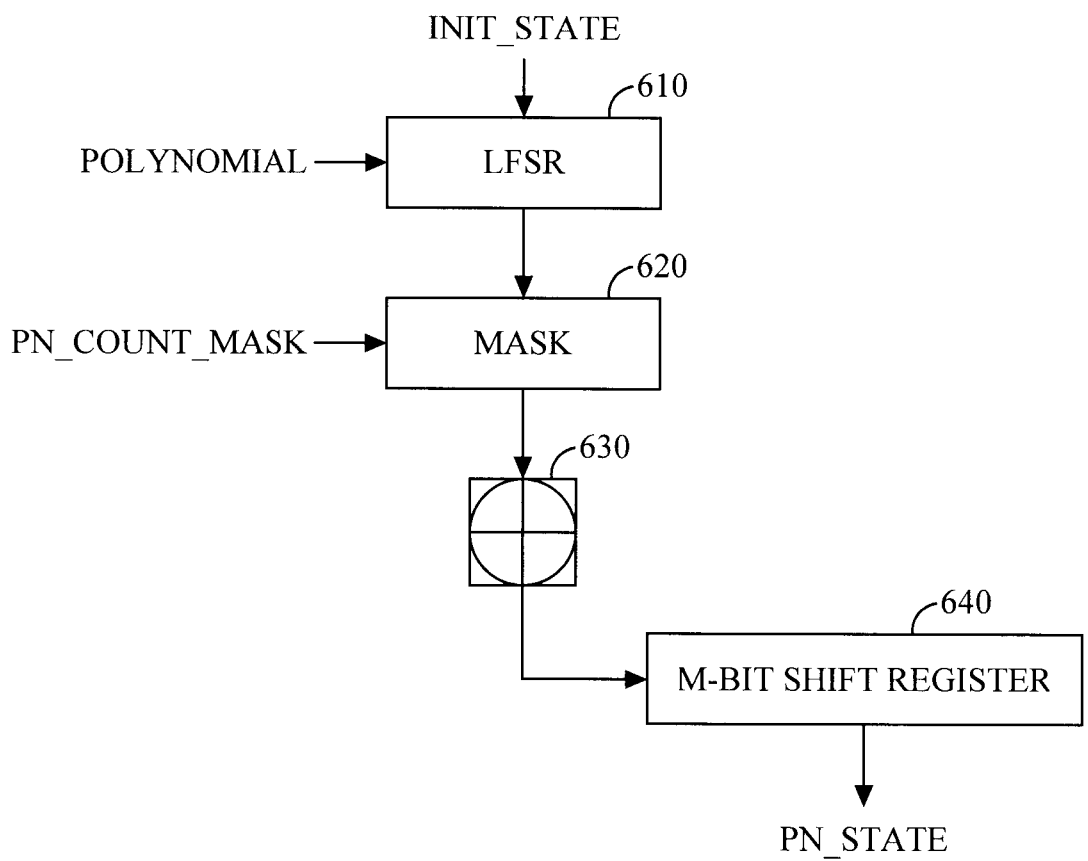
FIG. 6 is a generalized hardware configuration for calculating LFSR states in one embodiment of the present invention.

FIG. 6 depicts a generalized hardware configuration for supporting this procedure. INIT_STATE is loaded into M-bit LFSR 610. The state of LFSR 610 is delivered to mask 620, where the M-bit mask corresponding to the offset of PN_COUNT+PN_CODE, PN_COUNT_MASK, is used to mask the output state of LFSR 610. The resultant masked output is summed in GF(2) summer 630 to provide the delayed output value. LFSR 610 is provided with the appropriate POLYNOMIAL corresponding to LFSR1 or LFSR2. As LFSR 610 is cycled M times, the output of summer 630 is shifted into M-bit shift register 640. After M cycles, M-bit shift register 640 contains the desired PN_STATE that corresponds to the offset of PN_COUNT+PN_CODE. This hardware is utilized twice, first with LFSR1_INIT_STATE assigned to INIT_STATE to produce PN_STATE1, and then with LFSR2_INIT_STATE to produce PN_STATE2.

The procedure described for the hardware in FIG. 6 can be readily transformed into code suitable for processing in a DSP. The LFSR computations, masking, summing, and storing can be easily translated to DSP code by those of skill in the art.

To complete the description of this fifth procedure, a technique for calculating the appropriate PN_COUNT_MASK for various values of PN_COUNT and PN_CODE must be employed. These techniques are also known in the art. For example, the matrix multiplication procedure described with respect to the second procedure above provides one such technique. When pre-calculating various matrices $A^k$ corresponding to offsets k, the last row of each matrix $A^k$ is the desired mask for offset k. In similar fashion to the second procedure described above, a variety of masks can be pre-calculated for all the PN_COUNT values, or a subset thereof. The values can be stored in tables for each code, indexed on PN_COUNT. Or, as described in procedure four above, a single table indexed on PN_CODE+PN_COUNT can be employed. This procedure can be implemented to find the nearest PN_STATE1, PN_STATE2, and PN_COUNT to the desired TARGET_PN_POSITION. These three parameters are then simultaneously loaded in PN generator logic 230 to perform the instantaneous portion of the slew, and the slow slew procedure is then implemented to process the remaining residual slew. As before, the designer of an embodiment can trade off higher mask storage requirements and resultant lesser required slow slew with lower mask storage requirements with higher required slow slew.

Referring to FIG. 2, a designer skilled in the art will recognize how to incorporate the software version of this fifth procedure into DSP 220. Alternatively, the hardware depicted in FIG. 6 can be deployed as accelerator 250. In yet another alternative, the hardware depicted in FIG. 2A or FIG. 3 can be modified to incorporate the functions depicted in FIG. 6, allowing DSP 220 to reuse that hardware to perform the calculation of PN_COUNT, PN_STATE1, and PN_STATE2, in addition to its use in normal PN generation functions.

A sixth procedure for determining PN_STATE1 and PN_STATE2 for a corresponding PN_COUNT and PN_CODE utilizes any one of the prior five procedures (or combinations thereof) in combination with mask-delay techniques, described above, and commonly known in the art. In this procedure, the LFSRs are slewed according to the offset given by TARGET_PN_POSITION, without taking into consideration any offset required by the specific code (PN_CODE). Thus, the LFSRs will continuously cycle through their base sequences, or sequences with offset zero. To generate the desired PN sequences, masks associated with the specific code are applied to the LFSRs. For the sequences required in W-CDMA, a total of three masks will be required. A first mask is required for masking LFSR1 for use in generating the I sequence. The direct output of LFSR2 can be used in generating the I sequence, so no additional mask is required. For the Q sequence: a second for masking LFSR1 and a third for masking LFSR2, each for use in generating the Q sequence, are required. Each mask will be generated to produce the appropriate delay corresponding to PN_CODE, according to any of the mask generation procedures described above.

An alternate technique for fast slewing of multi-sequence PN sequence utilizes masking techniques, such as those described in reference to procedure six above, without determining and loading PN-STATE1, PN_STATE2, and PN_COUNT. Instead, masks are utilized to provide the necessary PN sequence components from a base truncated sequences.

Figure 7:
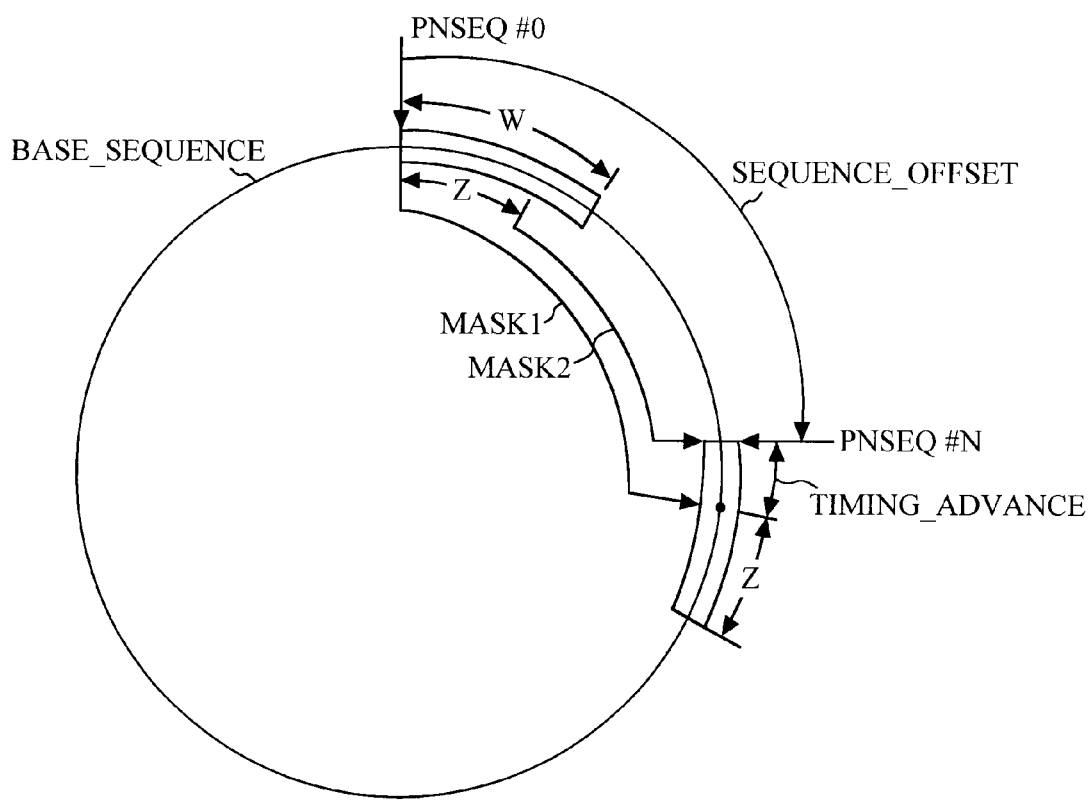
FIG. 7 illustrates the relationship between various PN sequences and associated masks in connection with an exemplary embodiment of the present invention.

FIG. 7 depicts the relationship between the various PN sequences and the masks employed. In FIG. 7, a circle labeled BASE_SEQUENCE represents the PN sequence defined by the non-truncated output of the LFSR. In W-CDMA systems, BASE_SEQUENCE is made up of $2^{18}-1$ values. A circle is a useful representation of this sequence, since after the entire space of LFSR states is cycled through, the process repeats itself. A truncated sequence of BASE_SEQUENCE is represented by a boxed portion of the circle, and identified by the start of the truncated sequence. The base truncated sequence is labeled PNSEQ#0, and is shown to have width W. W in W-CDMA systems will be 38,400. Another truncated sequence is labeled PNSEQ#N. PNSEQ#N is a truncated sequence of BASE_SEQUENCE which is offset by SEQUENCE_OFFSET. SEQUENCE_OFFSET corresponds to the code identifier, PN_CODE, used in previous discussions. PNSEQ#N also contains W PN values. As described in reference to procedure six above, PNSEQ#N can be generated with a mask corresponding to an advance of SEQUENCE_OFFSET.

In this alternate technique, the desired slew is indicated by an offset in the desired code, PNSEQ#N, and is labeled TIMING_ADVANCE. In this technique, rather than altering the LFSR state to produce the desired PN sequence, as described in procedures one through five above, or altering the base truncated sequence and applying a SEQUENCE_OFFSET mask, as described in procedure six above, the base truncated sequence is left unaltered and all slewing is performed with masking techniques described below.

MASK1 is shown to provide an offset from the beginning of PNSEQ#0 (the base truncated sequence) that corresponds to the beginning of the desired offset PNSEQ#N. The beginning of this desired sequence is shown as SEQUENCE_OFFSET+TIMING_ADVANCE. A value Z is shown which identifies the remainder of the truncated sequence, PNSEQ#N, which follows TIMING_ADVANCE. Z is determined as W−TIMING_ADVANCE. A segment of width Z in PNSEQ#0 corresponds with an offset segment of width Z in PNSEQ#N. Whenever PNSEQ#0 is in its first Z states, MASK1 can be used to generate the appropriate offset PNSEQ#N values. However, once PNSEQ#0 sequences past Z, MASK2 must be used, since the corresponding MASK1 sequence would be outside the boundaries of PNSEQ#N. As shown, for states in PNSEQ#0 greater than Z but less than W, MASK2 provides the appropriate values of PNSEQ#N between SEQUENCE_OFFSET and SEQUENCE_OFFSET+ TIMING_ADVANCE. Those skilled in the art will readily be able to generate MASK1 and MASK2 values for any desired PNSEQ#N and TIMING_ADVANCE values. Techniques for generating the delayed version of PNSEQ#N form PNSEQ#0 using MASK1 and MASK2 are described in co-pending U.S. patent application Ser. No. 09/175,386, entitled "METHOD AND APPARATUS FOR PSEUDONOISE SPREADING IN A CDMA COMMUNICATION SYSTEM", filed Oct. 19, 1998, assigned to the assignee of the present invention and incorporated herein by reference.

To utilize this alternate technique W-CDMA systems, a total of eight masks will be required to generate the I and Q sequence outputs. Two masks are required to generate the LFSR1 sequence for the I output, and two masks are required to generate the LFSR2 sequence for the I output. Similarly, two masks are needed for each of the LFSR1 and LFSR2 sequences required to generate the Q output. This totals eight masks. In the general case, if a look-up table is employed to store the masks, the look-up table can grow quite large if support for advances for a large number of unique codes is desired.

For clarity, PNSEQ#N is shown as not overlapping with PNSEQ#0. Those skilled in the art will recognize that the techniques apply equally if the sequences overlap. In the most extreme overlap, such as for LFSR2 of a W-CDMA system, SEQUENCE_OFFSET is always set to zero, and MASK1 and MASK2 simply provide TIMING_ADVANCE slewing in the truncated base sequence. Thus, one look-up table for LFSR2 masks can be shared among all the various unique codes generated.

A variety of techniques can be employed to reduce the number of masks required to implement this alternate technique. One example is to store only a subset of masks corresponding to the possible TIMING_ADVANCE values, and combine a slow_slew method on the base LFSR to perform any residual slew to locations in between available advance masks. Those of skill in the art will be able to combine the principles of slow slew, described above, with the alternate technique just described.

Another technique is to add additional LFSRs to reduce the number of masks required per TIMING_ADVANCE value. For example, two LFSRs can be deployed to generate the sequences to produce the I PN values, and two additional LFSRs configured to provide the sequences to produce the Q PN values. In this example, two pairs of MASK1 and MASK2 can be shared for I and Q PN sequence generation, and the required number of masks per TIMING_ADVANCE will be reduced to 4. (The benefit of this technique is reduced if, as in W-CDMA systems, LFSR2 always uses SEQUENCE_OFFSET of zero.)

Yet another technique to reduce mask storage requirements is to add additional LFSRs to provide various advanced PN sequences. For example, if a space of M total TIMING_ADVANCE values is to be supported, then providing the base truncated sequence plus a truncated sequence advanced by M/2 will lower the total required mask values by 2. Deploying the base sequence plus sequences advanced by M/4, M/2, and 3M/4 will reduce the total required mask values by 4, and so on.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing fast slewing PN generation comprising:
receiving a target PN position;
calculating a plurality of LFSR states corresponding to the target PN position;
loading the plurality of LFSR states in a plurality of LFSRs; and
producing one or more PN sequences based on the states of the plurality of LFSRs,
wherein the calculation of each of the plurality of LFSR states comprises:
accessing a mask corresponding to the target PN position from a table of masks;
loading an M-bit LFSR with a base state;
for each i incrementing from 0 to M−1:
applying the mask to the M-bit LFSR state, summing the resultant masked value using GF(2) addition to produce ADVANCED_LFSR_STATE(i);
advancing the M-bit LFSR one state; and
delivering ADVANCED_LFSR_STATE(M−1:0) as the LFSR state.

2. A method of performing fast slewing PN generation in a device characterized by plural LFSRs comprising:
receiving a target PN position;
calculating a plurality of LFSR states corresponding to the target PN position;
loading the plurality of LFSR states in a plurality of LFSRs; and
producing one or more PN sequences based on the states of the plurality of LFSRs,
wherein each of the plurality of LFSR states is calculated by accessing the LFSR state corresponding to the closest offset to the target PN position in a lookup-table containing LFSR states corresponding to various offsets.

3. A method of performing fast slewing PN generation in a device characterized by plural LFSRs comprising:
receiving a target PN position;
calculating an index counter value based on the target PN position;
calculating a plurality of LFSR states corresponding to the index counter state;
loading the index counter value into an index counter;
loading the plurality of LFSR states in a plurality of LFSRs; and
producing one or more PN sequences based on the states of the plurality of LFSRs.

4. A method of performing fast slewing PN generation in a device characterized by plural LFSRs comprising:
receiving a target PN position:
receiving a PN code offset;
calculating an index counter value based on the target PN position;
calculating a plurality of LFSR states corresponding to the index counter state and the PN code offset;
loading the index counter value into an index counter;
loading the plurality of LFSR states in a plurality of LFSRs; and
producing one or more PN sequences based on the states of the plurality of LFSRs,
wherein the calculation of each of the plurality of LFSR states comprises:
calculating a target advance value by adding the PN code offset to the target PN position; and
advancing a base state corresponding to each of the plurality of LFSR states by the target advance value to produce the plurality of the LFSR states.

5. A method of performing fast slewing PN generation in a device characterized by plural LFSRs comprising:
receiving a target PN position;
receiving a PN code offset;
calculating an index counter value closest to the target PN position from a subset of the possible target PN positions;
calculating a target advance value by adding the PN code offset to the index counter value;
calculating a plurality of LFSR states by advancing a base state corresponding to each of the plurality of LFSR states by the target advance value;
loading the index counter value into an index counter;
loading the plurality of LFSR states in a plurality of LFSRs;
performing residual slew to reach LFSR and counter states given by target PN position; and
producing one or more PN sequences based on the states of the plurality of LFSRs.

6. The method of claim 5, wherein each of the plurality of LFSR states is calculated by multiplying a base LFSR state by a matrix M, where matrix M is determined to advance the base LFSR state by the target PN position.

7. The method of claim 5, wherein the calculation of each of the plurality of LFSR states comprises:
accessing a mask corresponding to the target PN position from a table of masks;
loading an M-bit LFSR with a base state;
for each i incrementing from 0 to M−1:
applying the mask to the M-bit LFSR state, summing the resultant masked value using GF(2) addition to produce ADVANCED_LFSR_STATE(i);
advancing the M-bit LFSR one state; and
delivering ADVANCED_LFSR_STATE(M−1:0) as the LFSR state.

8. The method of claim 5, wherein each of the plurality of LFSR states is calculated by accessing the LFSR state corresponding to the closest offset to the target advance value in a lookup-table containing LFSR states corresponding to various offsets.

9. A method of performing fast slewing PN generation in a device characterized by plural LFSRs comprising:
receiving a target PN position;
receiving a PN code offset;
calculating an index counter value closest to the target PN position from a subset of the possible target PN positions;
calculating a target advance value according to the index counter value;
calculating a plurality of LFSR states by advancing a base state corresponding to each of the plurality of LFSR states by the target advance value;
loading the index counter value into an index counter;
loading the plurality of LFSR states in a plurality of LFSRs;
performing residual slew to reach LFSR and counter states given by target PN position;
calculating a sets of masks for delaying one or more truncated LFSR sequences according to the PN code offset; and producing one or more PN sequences based on the one or more delayed truncated LFSR sequences.

10. The method of claim 9, wherein each of the plurality of LFSR states is calculated by multiplying a base LFSR state by a matrix M, where matrix M is determined to advance the base LFSR state by the target PN position.

11. The method of claim 9, wherein the calculation of each of the plurality of LFSR states comprises:
accessing a mask corresponding to the target PN position from a table of masks;
loading an M-bit LFSR with a base state;
for each i incrementing from 0 to M−1:
applying the mask to the M-bit LFSR state, summing the resultant masked value using GF(2) addition to produce ADVANCED_LFSR_STATE(i);
advancing the M-bit LFSR one state; and
delivering ADVANCED_LFSR STATE(M−1:0) as the LFSR state.

12. The method of claim 9, wherein each of the plurality of LFSR states is calculated by accessing the LFSR state corresponding to the closest offset to the target advance value in a lookup-table containing LFSR states corresponding to various offsets.

13. A method of calculating an LFSR state for performing fast slewing PN generation in a device characterized by plural LFSRs comprising:
receiving a target advance value;
accessing a matrix M with an advance value k from a table of pre-computed matrices, wherein k*r corresponds to the target advance value;
loading the matrix M into a programmable matrix multiplier;
repeating a matrix multiply for r iterations using the programmable matrix multiplier to produce an LFSR state advanced by k*r, wherein the initial iteration uses a base LFSR state as the input to the programmable matrix multiplier and subsequent iterations use the result of the previous iteration as the input to the programmable matrix multiplier; and
delivering the $r^{th}$ iteration as the LFSR state.

14. A method for calculating an LFSR state comprising:
receiving a target advance value;
calculating N advance values $k_1$–$k_N$ and calculating N repeat values $r_1$–$r_N$ corresponding to the N advance values such that the sum of $r_1 k_1$ through $r_N k_N$ equal the target advance value;
for each i of N advance values $k_1$–$k_N$, given by $k_i$, with corresponding repeat values $r_1$–$r_N$, given by $r_1$:
(a) accessing a matrix M with an advance value $k_i$ from a table of pre-computed matrices;
(b) loading the matrix M into a programmable matrix multiplier;
(c) repeating a matrix multiply for $r_i$ iterations using the programmable matrix multiplier to produce an LFSR state advanced by $k_i * r_i$, wherein:
the initial iteration of step (C) when i=1 uses a base LFSR state as the input to the programmable matrix multiplier;
the initial iteration of step (c) when i>1 uses the result of the steps (a) through (c) for i−1; and
subsequent iterations for $r_i$ use the result of the previous iteration as the input to the programmable matrix multiplier; and
delivering the $r_N^{th}$ iteration as the LFSR state.

15. A method for calculating an LFSR state comprising:
receiving a target advance value;
accessing a mask corresponding to the target advance value from a table of masks;
loading an M-bit LFSR with a base state;
for each i incrementing from 0 to M−1:
applying the mask to the M-bit LFSR state, summing the resultant masked value using GF(2) addition to produce ADVANCED_LFSR_STATE(i);
advancing the M-bit LFSR one state; and
delivering ADVANCED_LFSR_STATE(M−1:0) as the LFSR state.

16. A method for calculating an LFSR state comprising:
receiving a target advance value;
accessing a mask corresponding to the target advance value from a table of masks;
loading an M-bit variable LFSR_STATE with a base state;
for each i incrementing from 0 to M−1:
applying the mask to LFSR_STATE, summing the resultant masked value using GF(2) addition to produce ADVANCED_LFSR_STATE(i);
applying a polynomial corresponding to the desired LFSR behavior to LFSR_STATE to produce LFSR_STATE(M−1);
shifting M−1 bits LFSR_STATE(M−1:1) into LFST_STATE(M−2:0); and
delivering ADVANCED_LFSR_STATE(M−1:0) as the LFSR state.

17. A device for fast slewing PN generation operable with a plurality of loadable LFSRs, comprising:
index means for providing an index corresponding to the state of the plurality of loadable LFSRs;
means for calculating a plurality of PN states for loading in the plurality of loadable LFSRs and a corresponding index state for loading in the index means; and
means for producing one or more PN sequences based on outputs from the plurality of loadable LFSRs,
wherein the means for calculating determines the plurality of PN states and the corresponding index counter state in response to a target PN position.

18. The device of claim 17, further comprising a free-running time reference,
and wherein the means for calculating determines:
the corresponding index state as the difference between the free-running time reference and the target PN position; and
the plurality of PN states in response to the corresponding index state.

19. A device for fast slewing PN generation operable with a plurality of loadable LFSRs, comprising:
index means for providing an index corresponding to the state of the plurality of loadable LFSRs;
means for calculating a plurality of PN states for loading in the plurality of loadable LFSRs and a corresponding index state for loading in the index means in response to a target PN position;
slew logic for adjusting the rate of state change in the plurality of loadable LFSRs and the index means in response to the target PN position; and
means for producing one or more PN sequences based on outputs from the plurality of loadable LFSRs.

20. The device of claim 19, further comprising a free-running time reference, and wherein:
   the means for calculating determines:
      the corresponding index state as the difference between the free-running time reference and the target PN position, or a portion thereof; and
      the plurality of PN states in response to the corresponding index state; and
   the slew logic adjusts the rate of state change in the plurality of loadable LFSRs and the index means in response to the target PN position and the free-running time reference to perform any residual slew required after loading of the plurality of loadable LFSRs and loading of the index means.

* * * * *